(12) United States Patent
Nickel et al.

(10) Patent No.: US 9,726,170 B1  
(45) Date of Patent: Aug. 8, 2017

(54) ROLLING DIAPHRAGM SEALS

(71) Applicant: TA INSTRUMENTS-WATERS L.L.C., Milford, MA (US)

(72) Inventors: Troy D. Nickel, Minneapolis, MN (US); Jason Chinavare, Hopkins, MN (US)

(73) Assignee: TA Instruments-Waters L.L.C., Milford, MA (US)

( * ) Notice: Subject to any disclaimer, the term of this patent is extended or adjusted under 35 U.S.C. 154(b) by 297 days.

(21) Appl. No.: 14/452,667

(22) Filed: Aug. 6, 2014

Related U.S. Application Data

(63) Continuation of application No. 14/449,966, filed on Aug. 1, 2014, now abandoned.

(51) Int. Cl.
| | | |
|---|---|---|
| *F04B 53/14* | (2006.01) | |
| *F04B 53/16* | (2006.01) | |
| *F16J 15/16* | (2006.01) | |

(52) U.S. Cl.
   CPC .......... *F04B 53/143* (2013.01); *F04B 53/164* (2013.01); *F16J 15/16* (2013.01)

(58) Field of Classification Search
   CPC .... F04B 53/144; F04B 53/146; F04B 53/164; F16J 5/56
   USPC ........................................ 92/165 R, 168, 144
   See application file for complete search history.

(56) References Cited

U.S. PATENT DOCUMENTS

| | | | | |
|---|---|---|---|---|
| 2,350,815 A | * | 6/1944 | Planche | .................... F04B 9/02 417/254 |
| 2,702,023 A | * | 2/1955 | Seeloff | .................... F01B 19/02 416/157 R |
| 3,359,362 A | | 12/1967 | Lusk et al. | |
| 3,373,694 A | * | 3/1968 | Taplin | .................... F04B 39/044 417/571 |
| 3,488,763 A | | 1/1970 | Lofquist et al. | |
| 3,730,056 A | | 5/1973 | Swander, Jr. | |
| 3,835,714 A | * | 9/1974 | van der Aa | .............. F16J 15/26 277/549 |
| 3,934,480 A | | 1/1976 | Nederlof | |
| 4,024,770 A | * | 5/1977 | Liesenborghs | .......... F16C 29/00 74/18.2 |
| 4,257,314 A | * | 3/1981 | Deschner | .............. F15B 15/224 188/287 |
| 4,281,589 A | * | 8/1981 | Stoll | .......................... F16J 3/06 92/109 |
| 5,725,365 A | | 3/1998 | Solomon et al. | |
| 8,627,708 B2 | | 1/2014 | McCloskey et al. | |

(Continued)

*Primary Examiner* — Thomas E Lazo  
(74) *Attorney, Agent, or Firm* — McCarter & English, LLP; Deborah M. Vernon; Heath T. Misley

(57) ABSTRACT

This document provides mechanical seals that include one or more rolling diaphragms. In one example embodiment, this document provides double rolling diaphragm seals that are usable in conjunction with various types of equipment including, but not limited to, accelerated life testing systems. In such a context, the double rolling diaphragm seals facilitate high-speed linear modulation of a variable volume pressure vessel, while maintaining precise volumetric control. Such an arrangement can facilitate an essentially frictionless linear actuation system having a long stroke, long service life, and precise volumetric control. In addition, this document provides linear actuator systems that can be used in adverse environmental conditions.

10 Claims, 5 Drawing Sheets

(56) References Cited

U.S. PATENT DOCUMENTS 8,695,636 B2     4/2014   Kuhnle et al.
2012/0073432 A1*   3/2012   Ingersoll ............. F04B 43/0054
                                                                      92/99

* cited by examiner

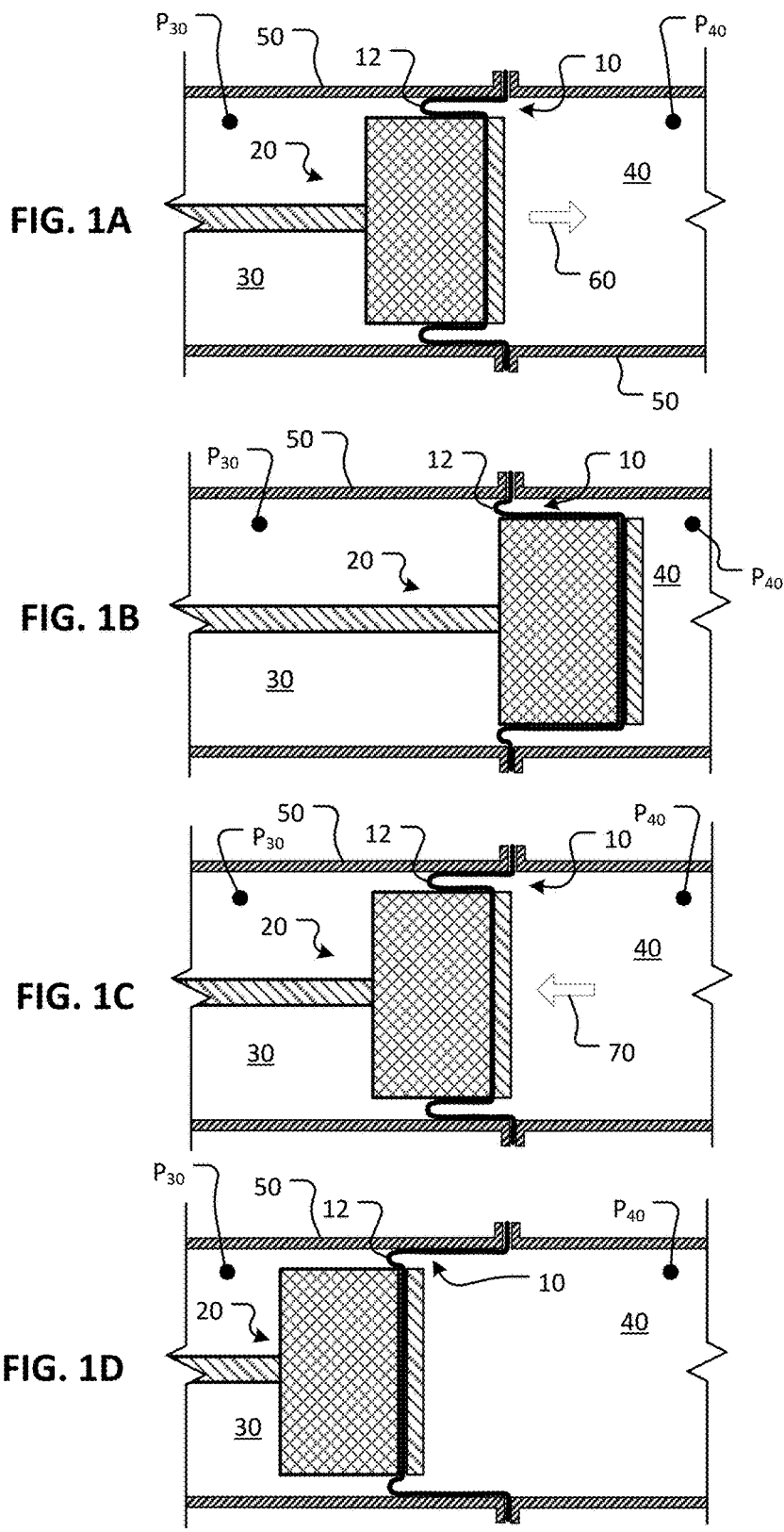

ROLLING DIAPHRAGM SEALS

CROSS REFERENCE TO RELATED APPLICATIONS

This application is a continuation application and claims the benefit of U.S. patent application Ser. No. 14/449,966, filed on Aug. 1, 2014, which is incorporated herein by referenced in its entirety.

BACKGROUND

1. Technical Field

This document relates to mechanical seals that include one or more rolling diaphragms. For example, this document relates to double rolling diaphragm seals that can be used in conjunction with various types of equipment, including accelerated life testing equipment.

2. Background Information

A rolling diaphragm can be used as a seal between a linear motion component (e.g., piston, actuator shaft, etc.) and a surrounding stationary member (e.g., a cylinder wall, an actuator housing, etc.). Such seals isolate one space from another. Therefore, rolling diaphragms prevent passage of materials, so that environmental contaminants are prevented from entering a linear actuator housing, for example. Rolling diaphragms can also be used to create a pressure vessel with a variable volume.

Rolling diaphragms move with almost no friction because the seal between the linear motion component and the surrounding stationary member is maintained by a rolling action rather than a sliding one. In some cases, the rolling diaphragm seals are made of fabric-reinforced molded elastomer, making them tough and versatile. Rolling diaphragms also are less prone to leaking and hysteresis than other sealing methods, such as O-rings. Generally, rolling diaphragms need little maintenance and/or lubrication.

Accelerated life testing (also known as accelerated wear testing or durability testing) is the process of testing an item by subjecting it to conditions (e.g., cycle time, stress, strain, temperatures, voltage, vibration, pressure, etc.) in excess of its normal service parameters in an effort to uncover faults and potential modes of failure in a short amount of time. Accelerated life testing can be been used to study materials, design concepts, design modifications, and durability variations caused by changes in manufacturing techniques.

SUMMARY

This document provides mechanical seals that include one or more rolling diaphragms. For example, this document provides double rolling diaphragm seals that can be used in conjunction with various types of equipment, including accelerated life testing equipment.

In one implementation, a rolling diaphragm seal assembly includes a first rolling diaphragm oriented in a first orientation; a second rolling diaphragm oriented in a second orientation that is reversed in relation to the first orientation, such that a space is defined between the first rolling diaphragm and the second rolling diaphragm; and an incompressible fluid disposed within the space.

Such a rolling diaphragm seal assembly may optionally include one of more of the following features. The space may comprise a confined space and the incompressible fluid may essentially fill an entirety of the space. The incompressible fluid may have a higher pressure than areas immediately external to the rolling diaphragm seal. The first rolling diaphragm and the second rolling diaphragm may be each configured to be attached to a shaft. The shaft may be configured to be driven by a linear actuator. The first rolling diaphragm and the second rolling diaphragm may be each configured to be attached to a surrounding structure. At least one of the first rolling diaphragm and the second rolling diaphragm may be comprised of a flexible material that is reinforced to be resistant to elongation. The first rolling diaphragm may comprise a first convolution defining a first vertex, and the second rolling diaphragm may comprise a second convolution defining a second vertex. The first vertex and the second vertex may be directed in opposite directions. The incompressible fluid may have a higher pressure than areas immediately external to the rolling diaphragm seal. The first vertex and the second vertex may be directed towards each other. The incompressible fluid may have a lower pressure than areas immediately external to the rolling diaphragm seal.

In another implementation, a linear actuator system for use in a hostile environment includes: a frame; a linear actuator attached to the frame, the linear actuator including a linear actuator shaft; a housing attached to the frame and enclosing the linear actuator such that the housing isolates the linear actuator from the environment; and a rolling diaphragm seal attached to the linear actuator shaft and to the frame or the housing such that the rolling diaphragm seal further isolates the linear actuator from the environment while allowing the linear actuator shaft to move in a back-and-forth motion.

Such a linear actuator system for use in a hostile environment may optionally include one or more of the following features. The rolling diaphragm seal may comprise a single rolling diaphragm. The rolling diaphragm seal may comprise a first rolling diaphragm oriented in a first orientation and a second rolling diaphragm oriented in a second orientation that is reversed in relation to the first orientation, and a space may be defined between the first rolling diaphragm and the second rolling diaphragm. An incompressible fluid may be disposed within the space. The space may comprise a confined space and the incompressible fluid may essentially fill an entirety of the space. The housing may be configured to facilitate cooling of the linear actuator. The housing may include a cooling air inlet port. The system may further comprise a liquid cooling system or a piezoelectric cooling system for cooling the linear actuator.

In another implementation, a rolling diaphragm seal assembly includes: a first rolling diaphragm oriented in a first orientation; a second rolling diaphragm oriented in a second orientation that is reversed in relation to the first orientation, such that a space is defined between the first rolling diaphragm and the second rolling diaphragm; and a gas disposed within the space.

Such a rolling diaphragm seal assembly may optionally include one or more of the following features. At least one of the first rolling diaphragm and the second rolling diaphragm may be comprised of a flexible material that is reinforced to be resistant to elongation. The first rolling diaphragm may comprise a first convolution defining a first vertex, and the second rolling diaphragm may comprise a second convolution defining a second vertex. The first vertex and the second vertex may be directed in opposite directions. The gas may have a higher pressure than areas immediately external to the rolling diaphragm seal. The first vertex and the second vertex may be directed towards each other. The gas may have a lower pressure than areas immediately external to the rolling diaphragm seal.

Particular embodiments of the subject matter described in this document can be implemented to realize one or more of the following advantages. First, one or more rolling diaphragm seals may be advantageously used in conjunction with a linear actuator system designed for use in adverse environments. Such environments may have conditions such as high temperature, high humidity, corrosivity, airborne particulates, and the like, and a combination thereof. The rolling diaphragm seals can serve to protect the linear actuator system from damage due to such adverse environmental conditions. Second, some implementations include two rolling diaphragm seals arranged in a manner that facilitates high-speed linear modulation of a variable volume pressure vessel, while advantageously maintaining precise volumetric control. That is, the use of a double rolling diaphragm seal can provide a rolling diaphragm seal that is resistant to deformation, even in the presence of differential pressure across the seal. Third, the rolling diaphragm seals provided herein provide an essentially frictionless seal. Fourth, the rolling diaphragm seals provided herein provide a long service life. Fifth, the rolling diaphragm seals provided herein are economical. Sixth, the rolling diaphragm seals provided herein can facilitate linear actuator systems to have a long stroke.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

FIG. 1A is a cross-sectional view of a linear actuator with a rolling diaphragm seal in accordance with some embodiments.

FIG. 1B shows the linear actuator and rolling diaphragm seal of FIG. 1A in an extended orientation.

FIG. 1C shows the linear actuator and rolling diaphragm seal of FIG. 1A in a mid-stroke orientation.

FIG. 1D shows the linear actuator and rolling diaphragm seal of FIG. 1A in a retracted orientation.

Like reference numbers represent corresponding parts throughout.

DETAILED DESCRIPTION

Figure 2A:
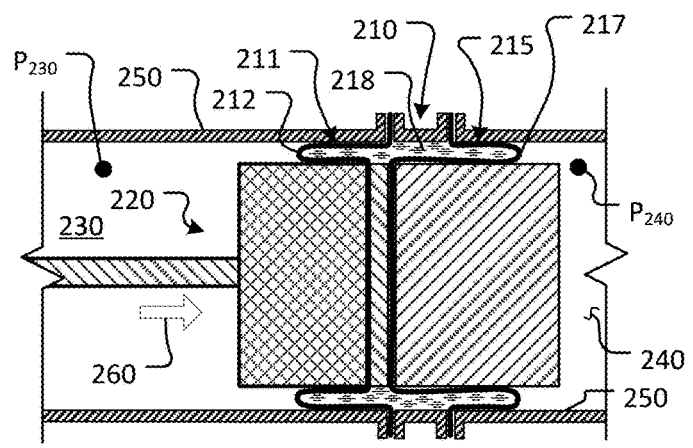
FIG. 2A is a cross-sectional view of a linear actuator with a double rolling diaphragm seal in accordance with some embodiments.

This document provides mechanical seals that include one or more rolling diaphragms. In one example embodiment, this document provides double rolling diaphragm seals that are usable in conjunction with various types of equipment including, but not limited to, accelerated life testing systems. As described further below, the double rolling diaphragm seals facilitate high-speed linear modulation of a variable volume pressure vessel, while maintaining precise volumetric control. In some implementations, such an arrangement can be advantageously incorporated with linear actuators that drive a fluid system used for accelerated life testing. Such an arrangement can facilitate an essentially frictionless linear actuation system having a long stroke, long service life, and precise volumetric control. In addition, this document provides linear actuator systems that can be used in adverse environmental conditions.

FIGS. 1A-1D are a sequence of figures that illustrate the motions of a rolling diaphragm seal 10 that is incorporated with a linear actuator shaft 20. In FIG. 1A, the linear actuator shaft 20 is located in a mid-stroke position and is in the process of extending linearly outward as indicated by arrow 60. In FIG. 1B, the linear actuator shaft 20 is extended and is in the process of reversing directions. In FIG. 1C, the linear actuator shaft 20 is located in a mid-stroke position and is in the process of retracting linearly inward as indicated by arrow 70. In FIG. 1D, the linear actuator shaft 20 is retracted and is in the process of reversing directions to return to the orientation shown in FIG. 1A. Accordingly, FIGS. 1A-1D illustrate the repetitive back-and-forth motion of the linear actuator shaft 20. In addition, FIGS. 1A-1D illustrate the orientation of the rolling diaphragm seal 10 as the linear actuator shaft 20 moves back-and-forth.

It should be understood that the linear actuator shaft 20 may be driven by various types of devices such as, but not limited to, a linear electromagnetic actuator, a rotary motor with a crank mechanism, a lead screw system, and the like. For example, in some implementations a linear electromagnetic actuator that includes one or more stator coils and flexural suspension elements that are connected to each end of an armature of the actuator is used to drive the linear actuator shaft 20. The flexural suspension elements allow frictionless movement of the armature in a primary direction of travel while providing resistance to movement of the armature in other degrees of freedom (e.g., translation, rotation). During operation of such a linear electromagnetic actuator, magnetic fields from a magnetic assembly that has one or more permanent magnets interact with the magnetic fields generated by the electrical current flowing in the stator wire coils, resulting in linear motion and/or force.

It should also be understood that the linear actuator shaft 20 does not represent a fluid-powered piston device. That is, the rolling diaphragm seal 10 and linear actuator shaft 20 are not representative of an air cylinder or hydraulic cylinder device. Such fluid-powered piston devices receive a pressurized fluid that typically energizes the movement of a piston and shaft. Accordingly, the energy from the pressurized fluid is transferred into a mechanical movement or force. The rolling diaphragm seal 10 and linear actuator shaft 20, in contrast, receive a mechanical force from a linear actuator. In some implementations, the mechanical force received by the rolling diaphragm seal 10 and linear actuator shaft 20 can be transferred into pressurizing a fluid system.

In the depicted implementation, the rolling diaphragm seal 10 and linear actuator shaft 20 separate a first space 30 from a second space 40. In one non-limiting example, the first space 30 represents an enclosure that houses the linear actuator that drives the linear actuator shaft 20, and the second space 40 represents a separate, distinct, environment such as a fluid volume. In particular examples, the second space 40 is a fluid chamber of an accelerated life testing system. The fluid system may also be referred to as a pressure vessel. Such accelerated life testing systems are sometimes actuated at high speeds with the purpose of rapid change of pressure or volume. For example, in some implementations the accelerated life testing systems are actuated such that the linear actuator shaft 20 travels back-and-forth at a cycle time of about 30 Hz or above.

While accelerated life testing systems are provided as an illustrative implementation of the rolling diaphragm seals provided herein, the rolling diaphragm seals may also be implemented in a wide range of other contexts. For example, the rolling diaphragm seals can be implemented in contexts such as a flexible seal for use with toxic, flammable, or corrosive gases that vary between pressure and vacuum. Additionally, the rolling diaphragm seals can be implemented in contexts such as dynamic pumping or vacuum conveyance of industrial fluids such as lubricants, rapid dispensing of adhesives for high-speed assembly, a seal within a fluid valve where the fluid may be under pressure or vacuum, a linearly actuated pump where two chambers oscillate between high and low pressures, and so on.

The rolling diaphragm seal 10 can be constructed of a compliant material. In some embodiments, the rolling diaphragm 10 can be made from materials such as, but not limited to, fluorocarbon, fluorosilicone, silicone, epichlorohydrin, nitrile, EPDM (ethylene propylene diene monomer), HNBR (hydrogenated nitrile butadiene rubber), Chemraz®, natural rubber, mixed elastomers, and the like. In some embodiments, the rolling diaphragm seal 10 includes one or more coatings (e.g., Teflon, etc.), a reinforcement element (e.g., polyester, nylon, nomex, knitted or woven fabrics, etc.), and/or other features.

In some embodiments, the rolling diaphragm seal 10 is molded. In some embodiments, the rolling diaphragm seal 10 is cut from a sheet of material. The rolling diaphragm seal 10 can be constructed to have a wide variety of physical features that, for example, facilitate its attachment to the linear actuator shaft 20 and the surrounding structure(s). Such physical features can include, but are not limited to, flanges, holes, threaded inserts, lips, grooves, reinforced areas, and the like.

In the depicted implementation, the rolling diaphragm seal 10 is clamped to the linear actuator shaft 20 and clamped to the surrounding structure 50. However, it should be understood that this is just one example of how the rolling diaphragm seal 10 can be physically attached to the linear actuator shaft 20 and the surrounding structure 50. Any and all other methods of attaching the rolling diaphragm seal 10 to the linear actuator shaft 20 and the surrounding structure 50 are also within the scope of this disclosure.

The rolling diaphragm seal 10 includes a convolution 12. The convolution 12 is a portion of the rolling diaphragm seal 10 that has a bend that is about 180°. The portion of the rolling diaphragm seal 10 that makes up the convolution 12 changes based on the position of the linear actuator shaft 20 in relation to the surrounding structure 50. In that sense, the convolution 12 "rolls" as the linear actuator shaft 20 moves back-and-forth. Therefore, the rolling diaphragm seal 10 performs its sealing function in an essentially frictionless manner.

The sealing function of the rolling diaphragm seal 10 provides various benefits. In one example, the rolling diaphragm seal 10 acts as a physical barrier to separate the first space 30 from the second space 40. The rolling diaphragm seal 10 thereby prevents material transfer between the first space 30 and the second space 40. The prevention of material transfer provided by the rolling diaphragm seal 10 can be particularly beneficial, for example, when the second space 40 is a hostile environment (e.g., high temperature, high humidity, particulate, corrosivity, etc.). In such a case, the rolling diaphragm seal 10 can advantageously isolate the first space 30 from the hostile environment of the second space 40.

In some implementations, the rolling diaphragm seal 10 may also provide other benefits. For example, the rolling diaphragm seal 10 can isolate the pressure $P_{30}$ of the first space 30 from the pressure $P_{40}$ the second space 40. This functionality can be beneficial in various contexts. One non-limiting example of such a context is an accelerated life testing system. In some such systems, the second space 40 contains a fluid medium (e.g., water, saline, etc.) and the motion of the linear actuator shaft 20 serves to modulate the pressure $P_{40}$ the fluid medium in the second space 40. The modulations of pressure $P_{40}$ can be used to cyclically operate or actuate devices that are in fluid communication with the fluid medium in the second space 40, so as to test the devices or systems. In such a case, the modulations of pressure $P_{40}$ is at least partially attributable to the ability of the rolling diaphragm seal 10 to isolate the pressure $P_{30}$ of the first space 30 from the pressure $P_{40}$ the second space 40.

During the aforementioned process of isolating the pressure $P_{30}$ of the first space 30 from the pressure $P_{40}$ the second space 40, a pressure differential may at least sometimes exist across the rolling diaphragm seal 10. In other words, the pressure $P_{30}$ of the first space 30 may differ from the pressure $P_{40}$ the second space 40. For example, at some times during the back-and-forth motion of the linear actuator shaft 20 the pressure $P_{30}$ of the first space 30 may be higher than the pressure $P_{40}$ the second space 40, while at other times during the back-and-forth motion of the linear actuator shaft 20 the pressure $P_{30}$ of the first space 30 may be lower than the pressure $P_{40}$ the second space 40.

The rolling diaphragm seal 10 sustains mechanical stresses due to the pressure differential between $P_{30}$ and $P_{40}$. Such a pressure differential acts particularly on the convolution 12. That is the case because the other portions of the rolling diaphragm seal 10 are generally supported by either the linear actuator shaft 20 or the surrounding structure 50.

Depending on the magnitude of the pressure differential between $P_{30}$ and $P_{40}$, in some cases the pressure differential may cause a deformation of the convolution 12. For example, when the pressure $P_{30}$ of the first space 30 is greater than the pressure $P_{40}$ of the second space 40, the convolution 12 may distend towards the second space 40. Alternatively, when the pressure $P_{30}$ of the first space 30 is greater than the pressure $P_{40}$ of the second space 40, the convolution 12 may deform by buckling or collapsing.

When the convolution 12 buckles or collapses, the stresses on the material of the rolling diaphragm seal 10 are greater than during normal operation. In result, the buckling or collapsing may lead to premature failure of the rolling diaphragm seal 10.

Further, when the convolution 12 deforms, the volume of the second space 40 is directly affected. For example, when the convolution 12 buckles, the volume of the second space 40 decreases and is less than it would be with a normal convolution shape. In at least some contexts (e.g., in the context of a fluid operated accelerated life testing system), such an effect on the volume of the second space 40 may be undesirable. For example, a fluid operated accelerated life testing system uses a controlled pressurization of second space 40 to actuate one or more devices or systems that are in fluid communication with the second space 40. When a deformation of the convolution 12 (or any other portion of the rolling diaphragm seal 10) occurs, the control of the pressurization of second space is compromised. In result, some unintended consequences (e.g. inability to obtain the desired pressure or vacuum, a non-linearity of applied pressure, etc.) pertaining to the actuation of the one or more devices or systems that are in fluid communication with the second space 40 may occur.

In some cases, the potential for such a deformation of the convolution 12 may limit the cycle speed and/or the stroke length (or other operational parameters such as loading rate or rate of actuation, etc.) that the linear actuator shaft 20 can be successfully run at. For example, in the context of a fluid operated accelerated life testing system, the cycle speed at which the linear actuator shaft 20 can be successfully run at may be limited because higher speeds may cause greater pressure differentials across the rolling diaphragm seal 10 (or reversing pressure differentials), to the extent that the convolution 12 may become deformed at times during the back-and-forth motion of the linear actuator shaft 20.

FIGS. 2A-2D provide an example rolling diaphragm seal 210 that is less susceptible to being deformed (i.e., less than rolling diaphragm seal 10) as a result of pressure differentials across the rolling diaphragm seal 210.

Figure 2B:
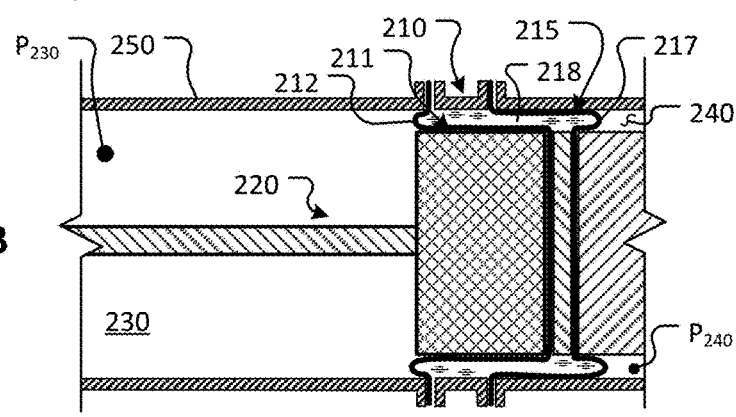
FIG. 2B shows the linear actuator and double rolling diaphragm seal of FIG. 2A in an extended orientation.
Figure 2C:
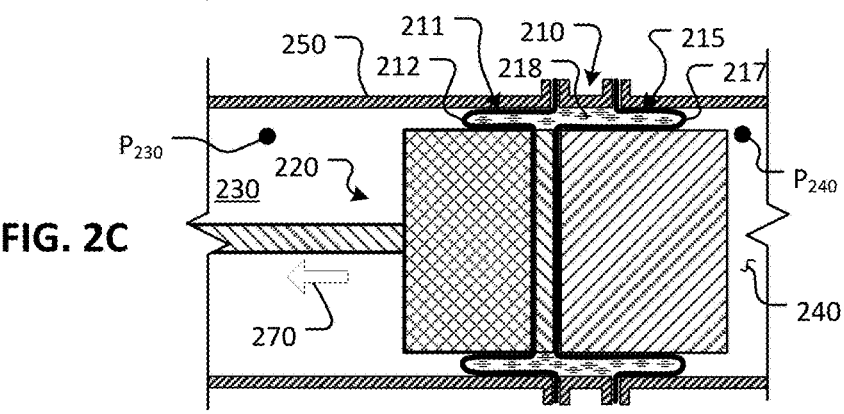
FIG. 2C shows the linear actuator and double rolling diaphragm seal of FIG. 2A in a mid-stroke orientation.
Figure 2D:
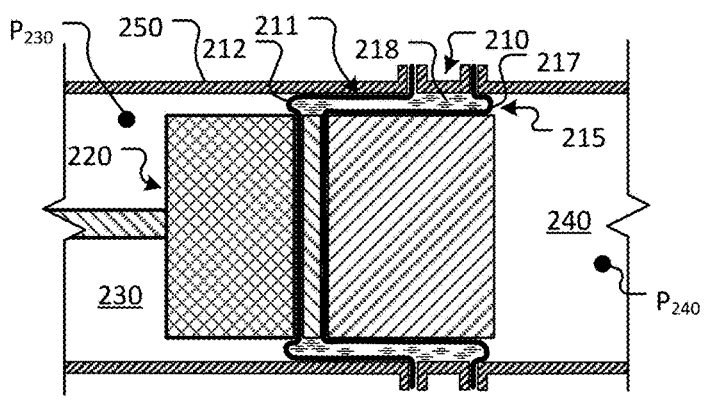
FIG. 2D shows the linear actuator and double rolling diaphragm seal of FIG. 2A in a retracted orientation.

FIGS. 2A-2D are analogous to FIGS. 1A-1D in that FIGS. 2A-2D are a sequence of figures that illustrate the motions of the rolling diaphragm seal 210 that is incorporated with a linear actuator shaft 220. In FIG. 2A, the linear actuator shaft 220 is located in a mid-stroke position and is in the process of extending linearly outward as indicated by arrow 260. In FIG. 2B, the linear actuator shaft 220 is extended and is in the process of reversing directions. In FIG. 2C, the linear actuator shaft 220 is located in a mid-stroke position and is in the process of retracting linearly inward as indicated by arrow 270. In FIG. 2D, the linear actuator shaft 220 is retracted and is in the process of reversing directions to return to the orientation shown in FIG. 2A. Accordingly, FIGS. 2A-2D illustrate the repetitive back-and-forth motion of the linear actuator shaft 220. In addition, FIGS. 2A-2D illustrate the orientation of the rolling diaphragm seal 210 as the linear actuator shaft 220 moves back-and-forth.

Other than the rolling diaphragm seal 210, the other components such as the linear actuator shaft 220, the linear actuator, the surrounding structure 250, the first space 230, and the second space 240 are analogous to corresponding components described above in reference to FIGS. 1A-1D.

A description of an exemplary structure of the rolling diaphragm seal 210 will now be provided. In some embodiments, the rolling diaphragm seal 210 includes a first rolling diaphragm 211 and a second rolling diaphragm 215. Each rolling diaphragm 211 and 215 is attached to the linear actuator shaft 220 and to the surrounding structure 250. However, in the depicted embodiment the first rolling diaphragm 211 is oriented reverse to the second rolling diaphragm 215. That is, in some embodiments the first and second rolling diaphragms 211 and 215 are oriented as mirror images of each other. The first and second rolling diaphragms 211 and 215 can be individually constructed and configured like the rolling diaphragm seal 10 described above.

The first rolling diaphragm 211 includes a convolution 212. The second rolling diaphragm 215 includes a convolution 217. In the depicted embodiment, the first and second rolling diaphragms 211 and 215 are oriented such that the vertices defined by the convolutions 212 and 217 are directed away from each other in opposite directions. Both convolutions 212 and 217 roll in response to the back-and-forth motion of the linear actuator shaft 220 (in manners analogous to the rolling of convolution 12 as described above). The rolling diaphragm seal 210 thereby provides an essentially frictionless seal that separates and isolates the first space 230 from the second space 240.

A sealed space with a consistent volume (also referred to herein as a confined space) exists between the first and second rolling diaphragms 211 and 215. In the depicted embodiment, a fluid 218 is essentially filling the entire sealed space between the first and second rolling diaphragms 211 and 215. In some implementations, the fluid 218 may be water, or another liquid that is incompressible or minimally compressible. In some such implementations, the incompressible or minimally compressible fluid 218 may be pressurized in relation to spaces immediately external to the rolling diaphragm seal 210 so that the rolling diaphragm seal 210 is in an inflated condition. In some implementations, the fluid 218 may be air, or another gas. In some such implementations, the gas may be pressurized in relation to the spaces immediately external to the rolling diaphragm seal 210, or the gas may have a pressure that is nominally equal to the spaces immediately external to the rolling diaphragm seal 210.

The rolling diaphragm seal 210 is configured to beneficially resist deformation when exposed to a pressure differential across the rolling diaphragm seal 210. That is, the distension and/or buckling of convolution 12 as described above is essentially prevented by the design of the rolling diaphragm seal 210. In result, the rolling diaphragm seal 210 can be advantageous implemented in some contexts, such as, but not limited to, the fluid operated accelerated life testing systems as described above.

The rolling diaphragm seal 210 resists deformation at least in the following manner. When the pressure $P_{230}$ of the first space 230 is greater than the pressure $P_{240}$ of the second space 240, the convolution 212 may tend to be compressed by the differential pressure. However, rolling diaphragm seal 210 resists deformation from the differential pressure because that pressure on convolution 212 is transferred from the convolution 212 to the fluid 218, and then from the fluid 218 to the convolution 217. It can be seen that in order for the convolution 212 to deform, the convolution 217 would also need to deform. While the pressure on convolution 212 would tend deform convolution 212 toward the space between the first and second rolling diaphragms 211 and 215 (such as by buckling), the consequent pressure on convolution 217 would tend to deform convolution 217 away from the space between the first and second rolling diaphragms 211 and 215. The convolution 217 will be highly resistant to deforming away from the space between the first and second rolling diaphragms 211 and 215 because such a deformation would require an elongation of the material comprising the second rolling diaphragm 215. The material of the first and second rolling diaphragms 211 and 215 can be selected to be resistant to stretching (such as by selecting a fabric reinforced material, and the like). In result, the rolling diaphragm seal 210 is highly resistant to deformation from pressure differentials.

The use of an incompressible fluid as the fluid 218 will cause the rolling diaphragm seal 210 to resists deformation to a greater extent than the use of a compressible fluid as the fluid 218. However, in some implementations a compressible fluid used as the fluid 218 may provide sufficient resistance to deformation. In some such implementations, the compressible fluid may be pressurized in relation to the areas immediately surrounding the rolling diaphragm seal 210 to provide additional resistance to deformation.

Figure 5:
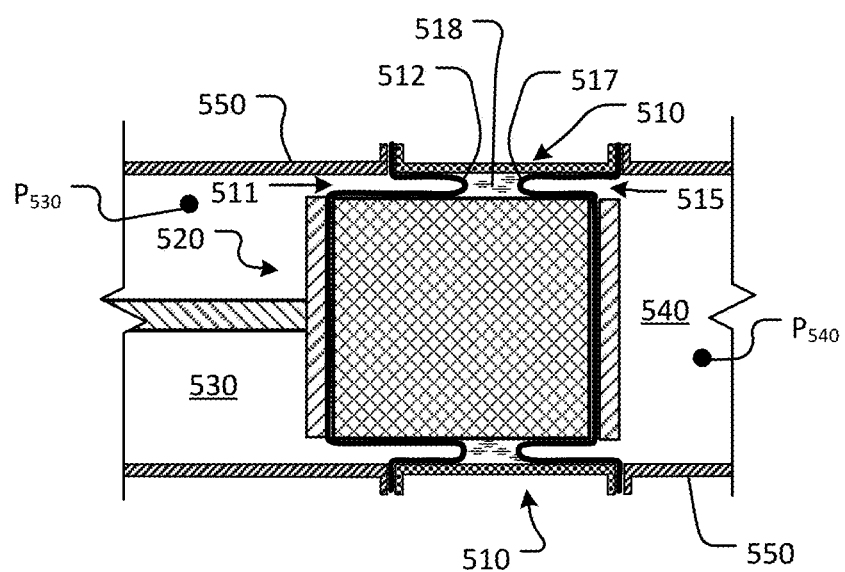
FIG. 5 is a cross-sectional view of a linear actuator with another type of double rolling diaphragm seal in accordance with some embodiments.

Referring to FIG. 5, another example rolling diaphragm seal 510 is incorporated with a linear actuator shaft 520. Other than the rolling diaphragm seal 510, the other components such as the linear actuator shaft 520, the linear actuator, the surrounding structure 550, the first space 530, and the second space 540 are generally analogous to corresponding components described above in reference to FIGS. 1A-1D and FIGS. 2A-2D.

In some embodiments, the rolling diaphragm seal 510 includes a first rolling diaphragm 511 and a second rolling diaphragm 515. Each rolling diaphragm 511 and 515 is attached to the linear actuator shaft 520 and to the surrounding structure 550. The first rolling diaphragm 511 is oriented reverse to the second rolling diaphragm 515.

The first rolling diaphragm 511 includes a convolution 512. The second rolling diaphragm 515 includes a convolution 517. In the depicted embodiment, the first and second rolling diaphragms 511 and 515 are oriented such that the vertices defined by the convolutions 512 and 517 are directed towards each other. Both convolutions 512 and 517 roll in response to the back-and-forth motion of the linear actuator shaft 520 (in manners analogous to the rolling of convolutions 212 and 217 as described above). The rolling diaphragm seal 510 thereby provides an essentially frictionless seal that separates and isolates the first space 530 from the second space 540.

A sealed space with a consistent volume (a confined space) exists between the first and second rolling diaphragms 511 and 515. In the depicted embodiment, a fluid 518 is essentially filling the entire sealed space between the first and second rolling diaphragms 511 and 515. In some implementations, the fluid 518 may be water, or another liquid that is incompressible or minimally compressible. In some such implementations, the incompressible or minimally compressible fluid 518 may be pressurized in relation to spaces immediately external to the rolling diaphragm seal 510 so that the rolling diaphragm seal 510 is in an inflated condition. In some implementations, the fluid 518 may be air, or another gas. In some implementations, the fluid 518 may be at a lower pressure than the pressures of the spaces immediately external to the rolling diaphragm seal 510, or nominally equal thereto.

The rolling diaphragm seal 510 is configured to beneficially resist deformation when exposed to a pressure differential across the rolling diaphragm seal 510. That is, the distension and/or buckling of convolution 12 as described above is essentially prevented by the design of the rolling diaphragm seal 510. In result, the rolling diaphragm seal 510 can be advantageous implemented in some contexts, such as, but not limited to, the fluid operated accelerated life testing systems as described above.

The rolling diaphragm seal 510 resists deformation at least in the following manner. When the pressure $P_{530}$ of the first space 530 is greater than the pressure $P_{540}$ of the second space 540, the convolution 512 will resist extension and the convolution 517 will not buckle or collapse because the convolution 512 would need to extend (on account of the fluid 518) for the convolution 517 to buckle or collapse. The result is essentially the same when the pressure $P_{530}$ of the first space 530 is less than the pressure $P_{540}$ of the second space 540. That is, the convolution 517 will resist extension and the convolution 512 will not buckle or collapse because the convolution 517 would need to extend (on account of the fluid 518) for the convolution 512 to buckle or collapse. The material of the first and second rolling diaphragms 511 and 515 can be selected to be resistant to elongation in extension (such as by selecting a fabric reinforced material, and the like). In result, the rolling diaphragm seal 510 is highly resistant to deformation from pressure differentials.

The use of an incompressible fluid as the fluid 518 will cause the rolling diaphragm seal 510 to resist deformation to a greater extent than the use of a compressible fluid as the fluid 518. However, in some implementations a compressible fluid used as the fluid 518 may provide sufficient resistance to deformation. In some such implementations, the compressible fluid may be pressurized in relation the spaces immediately external to the rolling diaphragm seal 510 to provide additional resistance to deformation.

Figure 3A:
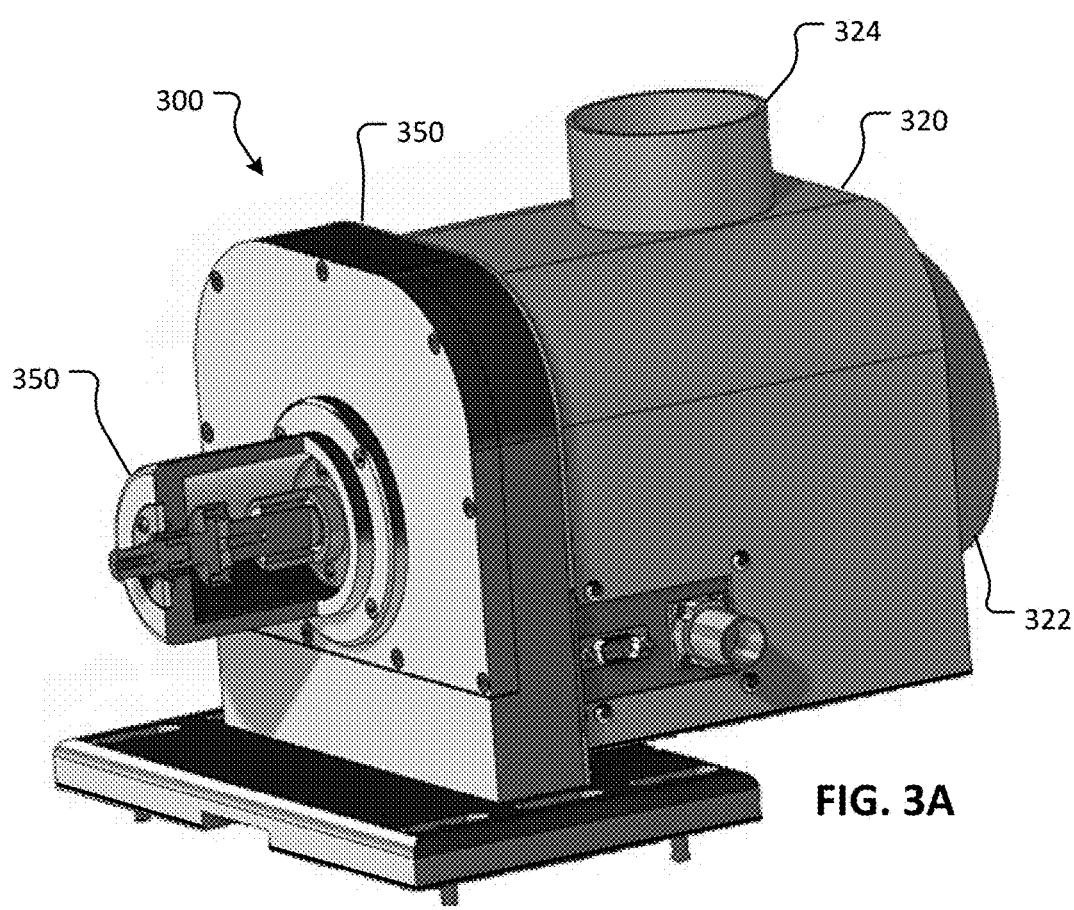
FIG. 3A is a perspective view of a linear actuator that is designed for use in adverse environments. The actuator shaft portion is shown in a cross-sectional view.
Figure 3B:
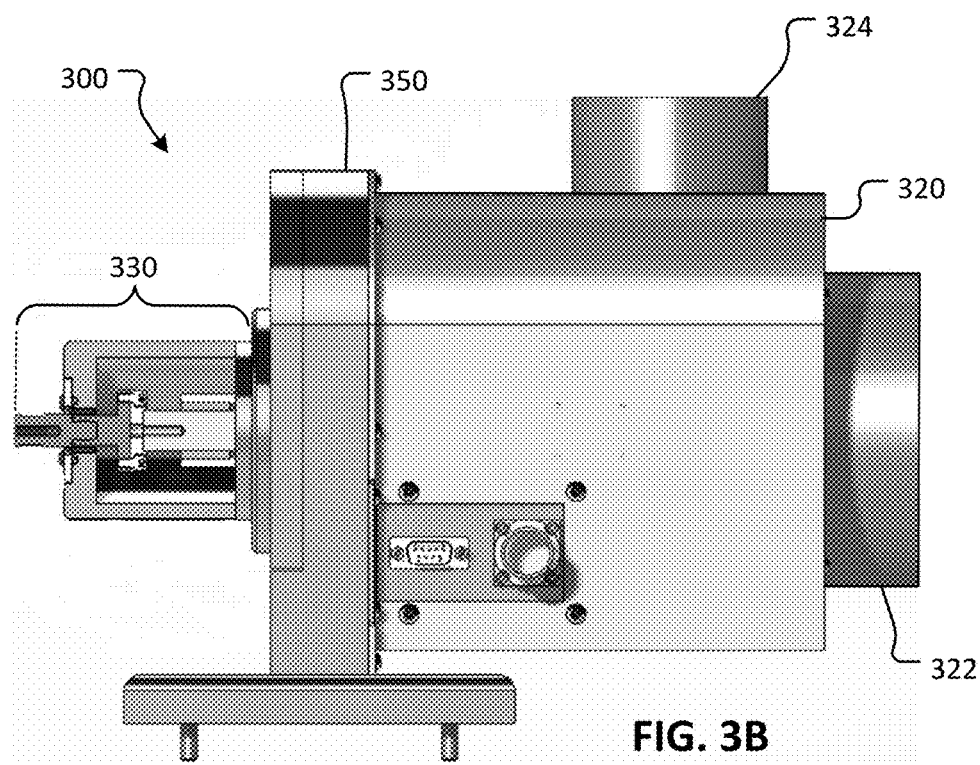
FIG. 3B is a side view of the linear actuator of FIG. 3A. Again, the actuator shaft portion is shown in a cross-sectional view.

Referring to FIGS. 3A and 3B, a linear actuator system 300 is configured for use in adverse environments. Such environments may have conditions such as high temperature, high humidity, corrosivity, airborne particulates, and the like, and a combination thereof. In some embodiments, the linear actuator system 300 is configured to be submersible such that it can operate when surrounded by a liquid (e.g., underwater).

The rolling diaphragm seals described above can serve to protect the linear actuator system 300 from damage due to adverse environmental conditions. Moreover, in some circumstances the rolling diaphragm seals can also serve to protect the environment outside of the linear actuator system 300 from the contents of the linear actuator system 300. Such a feature may be beneficial, for example, when the linear actuator system 300 is operated in a clean-room environment.

The linear actuator system 300 includes a frame 350, an enclosure 320, and a linear actuator shaft portion 330. The linear actuator shaft portion 330 is shown in cross-section to provide enhanced visualization.

The housing 320 encloses a linear actuator (not shown) which is mounted to the frame 350. The linear actuator can be any of a variety of different types of linear actuators such as, but not limited to, a linear electromagnetic actuator, a rotary motor with a crank mechanism, a lead screw system, and the like.

As mentioned previously, the linear actuator system 300 is configured for use in adverse environments. Therefore, in the depicted embodiment the housing 320 includes a cooling air input 322 and a cooling air output 324. Using the cooling air input 322 and the cooling air output 324, a supply of clean cool air can be provided within the housing 320 to cool the linear actuator located therein. In this fashion, the linear actuator system 300 can be isolated from the surrounding adverse environment. In some embodiments, just the cooling air input 322 is included and the housing 320 is pressurized in relation to the ambient environment surrounding the linear actuator system 300 so that the cooling air is emitted from the housing 320 to the ambient environment. In some embodiments, other types of cooling systems are used. For example, in some embodiments the linear actuator system 300 is liquid cooled. Further, in some embodiments the linear actuator system 300 includes a piezoelectric cooling system.

In some embodiments, the linear actuator system 300 (e.g., the frame 350 and the housing 320) is sealed to isolate its internal spaces from the surrounding adverse environment. In particular embodiments, the linear actuator system 300 is hermetically sealed.

Figure 4A:
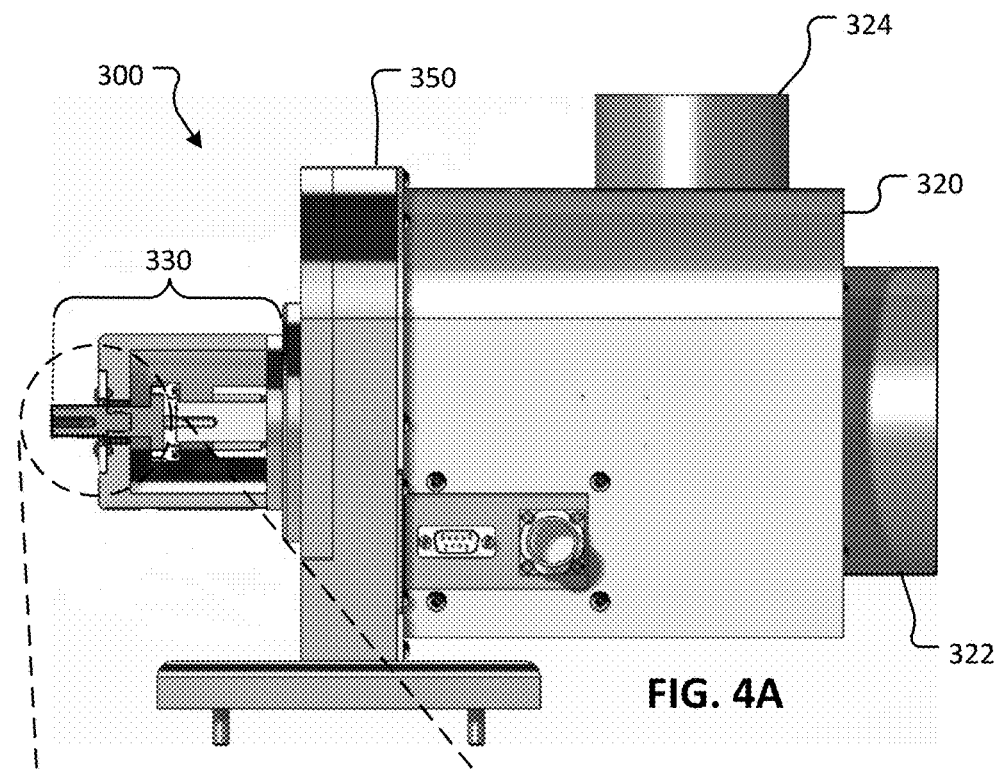
FIG. 4A is a side view of the linear actuator of FIG. 3A. Again, the actuator shaft portion is shown in a cross-sectional view.
Figure 4B:
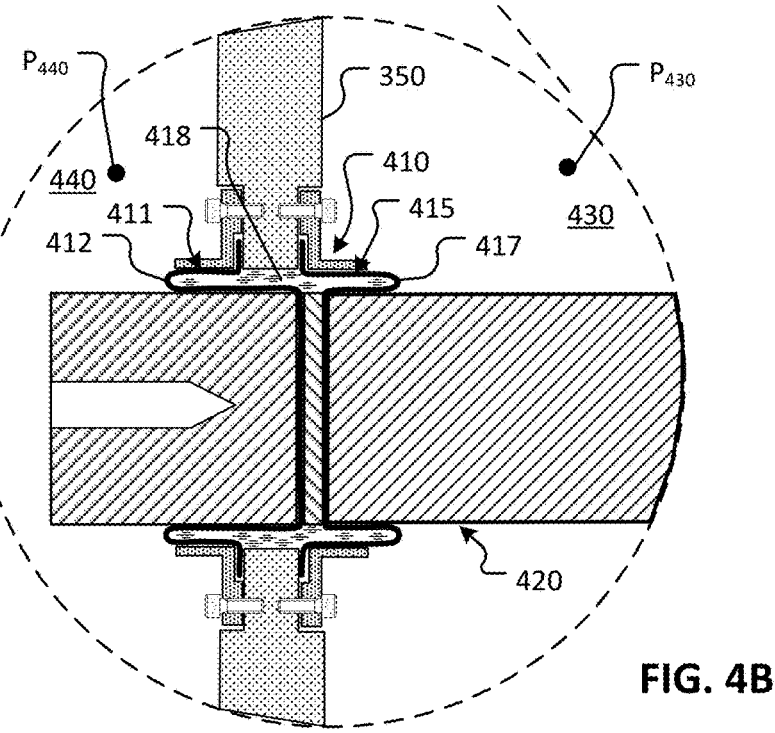
FIG. 4B is a partial enlarged view of the linear actuator of FIG. 3A showing a rolling diaphragm seal.

Referring to FIGS. 4A and 4B, the linear actuator system 300 can include a rolling diaphragm seal 410. In the depicted embodiment, the rolling diaphragm seal 410 includes a first rolling diaphragm 411 and a second rolling diaphragm 415. Each rolling diaphragm 411 and 415 is attached to the linear actuator shaft 420 and to the frame 350. As with the rolling diaphragm seal 210 (described above in reference to FIGS. 2A-2D), in the depicted embodiment the first rolling diaphragm 411 is oriented reverse to the second rolling diaphragm 415. That is, in some embodiments the first and second rolling diaphragms 411 and 415 are oriented as mirror images of each other. The first and second rolling diaphragms 411 and 415 can be individually constructed and configured like the rolling diaphragm seal 10 described above.

While the depicted embodiment of the linear actuator system 300 includes a rolling diaphragm seal 410 having first and second rolling diaphragms 411 and 415, in some embodiments the linear actuator system 300 includes a single rolling diaphragm seal (e.g., like rolling diaphragm seal 10 described in reference to FIGS. 1A-1D).

The first rolling diaphragm 411 includes a convolution 412. The second rolling diaphragm 415 includes a convolution 417. Both convolutions 412 and 417 roll in response to the back-and-forth motion of the linear actuator shaft 420 (in manners analogous to the rolling of convolution 12 as described above). The rolling diaphragm seal 410 thereby provides an essentially frictionless seal that separates and isolates the first space 430 from the second space 440.

A sealed space with a consistent volume exists between the first and second rolling diaphragms 411 and 415. In the depicted embodiment, a fluid 418 is filling the sealed space between the first and second rolling diaphragms 411 and 415. In some implementations, the fluid 418 may be water, or another liquid. In some implementations, the fluid 418 may be air, or another gas.

The rolling diaphragm seal 410 is configured to beneficially resist deformation when exposed to a pressure differential across the rolling diaphragm seal 410. That is, the distension and/or buckling of convolution 12 as described above is essentially prevented by the design of the rolling diaphragm seal 410. The rolling diaphragm seal 410 can prevent the distension and/or buckling of convolution 12 regardless of whether the pressure $P_{430}$ of the first space 430 is greater than the pressure $P_{440}$ of the second space 440, or whether the pressure $P_{430}$ of the first space 430 is less than the pressure $P_{440}$ of the second space 440. In result, the rolling diaphragm seal 410 can be advantageous implemented in some contexts, such as, but not limited to, the fluid operated accelerated life testing systems as described above.

The rolling diaphragm seal 410 resists deformation at least in the following manner. When the pressure $P_{430}$ of the first space 430 is greater than the pressure $P_{440}$ of the second space 440, the convolution 412 may tend to be compressed by the differential pressure. However, rolling diaphragm seal 410 resists deformation from the differential pressure because that pressure on convolution 412 is transferred from the convolution 412 to the fluid 418, and then from the fluid 418 to the convolution 417. It can be seen that in order for the convolution 412 to deform, the convolution 417 would also need to deform. While the pressure on convolution 412 would tend deform convolution 412 toward the space between the first and second rolling diaphragms 411 and 415 (such as by buckling), the consequent pressure on convolution 417 would tend to deform convolution 417 away from the space between the first and second rolling diaphragms 411 and 415. The convolution 417 will be highly resistant to deforming away from the space between the first and second rolling diaphragms 411 and 415 because such a deformation would require an elongation of the material comprising the second rolling diaphragm 415. The material of the first and second rolling diaphragms 411 and 415 can be selected to be resistant to stretching (such as by selecting a fabric reinforced material, and the like). In result, the rolling diaphragm seal 410 is highly resistant to deformation from pressure differentials in either direction.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A rolling diaphragm seal assembly comprising:
   a first rolling diaphragm oriented in a first orientation;
   a second rolling diaphragm oriented in a second orientation that is reversed in relation to the first orientation, such that a space is defined between the first rolling diaphragm and the second rolling diaphragm and the first rolling diaphragm and the second rolling diaphragm isolate high pressures and low pressures within a chamber from ambient pressure outside the chamber; and an incompressible fluid disposed within the space and disposed to resist deformation of the first rolling diaphragm and the second rolling diaphragm;

wherein at least one of the first rolling diaphragm and the second rolling diaphragm are comprised of a flexible material that is reinforced to be resistant to elongation.

2. A rolling diaphragm seal assembly comprising:
a first rolling diaphragm oriented in a first orientation, wherein the first rolling diaphragm comprises a first convolution defining a first vertex;
a second rolling diaphragm oriented in a second orientation that is reversed in relation to the first orientation, such that a space is defined between the first rolling diaphragm and the second rolling diaphragm and the first rolling diaphragm and the second rolling diaphragm isolate high pressures and low pressures within a chamber from ambient pressure outside the chamber, wherein the second rolling diaphragm comprises a second convolution defining a second vertex; and
an incompressible fluid disposed within the space and disposed to resist deformation of the first rolling diaphragm and the second rolling diaphragm;
wherein the first vertex and the second vertex are directed towards each other.

3. The rolling diaphragm seal assembly of claim 2, wherein the incompressible fluid has a lower pressure than areas immediately external to the rolling diaphragm seal.

4. A rolling diaphragm seal assembly comprising:
a first rolling diaphragm oriented in a first orientation;
a second rolling diaphragm oriented in a second orientation that is reversed in relation to the first orientation, such that a space is defined between the first rolling diaphragm and the second rolling diaphragm and the first rolling diaphragm and the second rolling diaphragm isolate high pressures and low pressures within a chamber from ambient pressure outside the chamber; and
a gas disposed within the space and disposed to resist deformation of the first rolling diaphragm and the second rolling diaphragm.

5. The rolling diaphragm seal assembly of claim 4, wherein at least one of the first rolling diaphragm and the second rolling diaphragm are comprised of a flexible material that is reinforced to be resistant to elongation.

6. The rolling diaphragm seal assembly of claim 4, wherein the first rolling diaphragm comprises a first convolution defining a first vertex, wherein the second rolling diaphragm comprises a second convolution defining a second vertex.

7. The rolling diaphragm seal assembly of claim 6, wherein the first vertex and the second vertex are directed in opposite directions.

8. The rolling diaphragm seal assembly of claim 7, wherein the gas has a higher pressure than areas immediately external to the rolling diaphragm seal.

9. The rolling diaphragm seal assembly of claim 6, wherein the first vertex and the second vertex are directed towards each other.

10. The rolling diaphragm seal assembly of claim 9, wherein the gas has a lower pressure than areas immediately external to the rolling diaphragm seal.

\* \* \* \* \*